Oct. 22, 1968 J. W. JACOBS 3,407,285

DOMESTIC RANGE WITH VARIABLE AREA COOKING REGIONS

Filed Oct. 23, 1965 2 Sheets-Sheet 1

INVENTOR.
James W. Jacobs
BY
J. C. Evans
HIS ATTORNEY

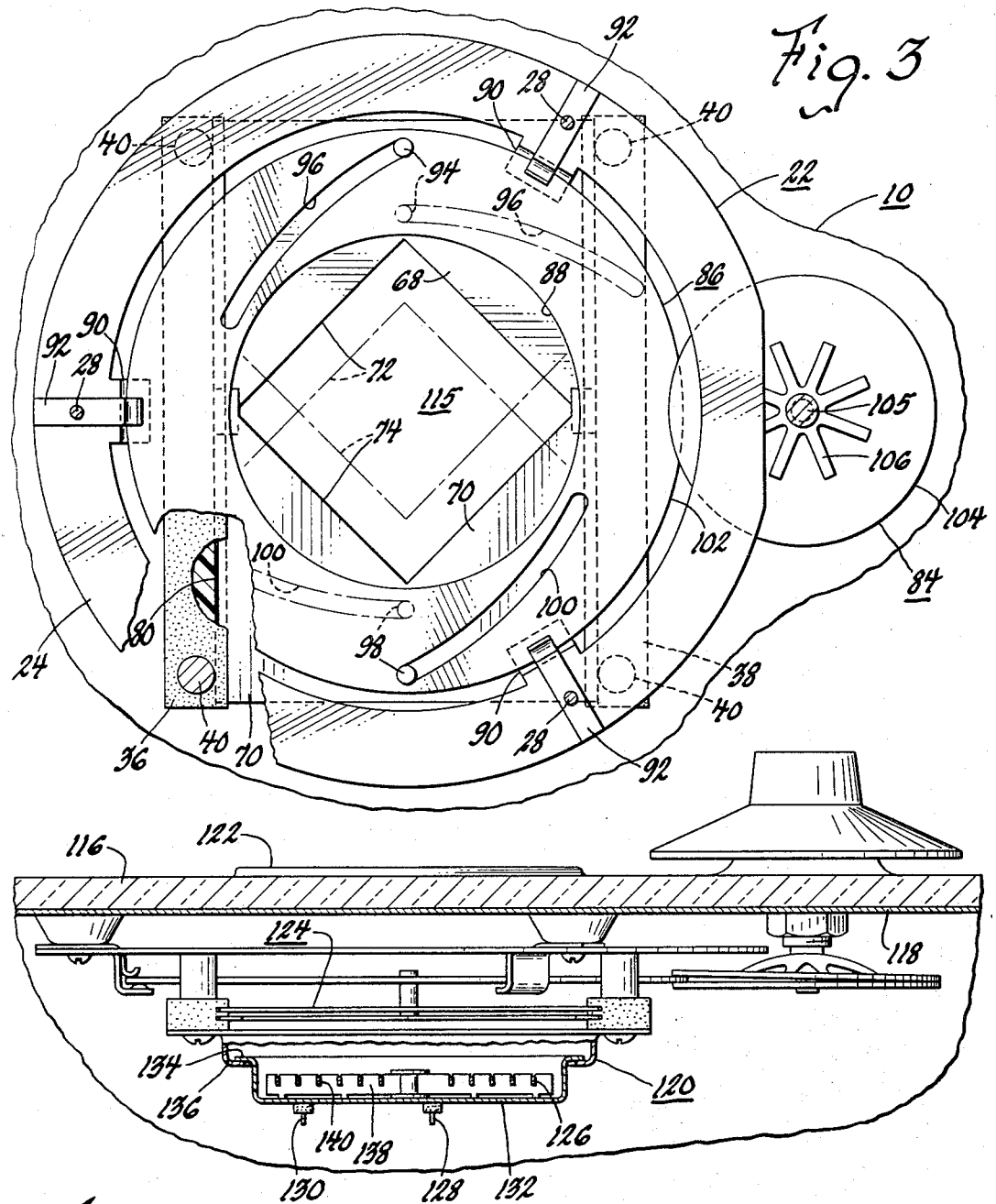

United States Patent Office 3,407,285
Patented Oct. 22, 1968

3,407,285
DOMESTIC RANGE WITH VARIABLE AREA COOKING REGIONS
James W. Jacobs, Dayton, Ohio, assignor to General Motors Corporation, Detroit, Mich., a corporation of Delaware
Filed Oct. 23, 1965, Ser. No. 503,733
2 Claims. (Cl. 219—456)

ABSTRACT OF THE DISCLOSURE

In preferred form, a domestic range having a continuous solid top of translucent material and an attached opaque mask with openings therethrough to limit the transmission of infrared radiation through the solid top to define cooking regions defined by these openings. To prohibit the leakage of infrared radiation through the annular space which surrounds a relatively small diameter cooking vessel, means are provided including parallel plates movable with respect to one another to define heating regions of variable area which can be adjusted to correspond to the bottom surface area of a cooking vessel.

---

This invention is directed to surface cooking assemlies and more particularly to means for varying the planar extent of the effective heating area in a surface heating unit.

In surface cooking assemblies, it is desirable to match the planar extent of a surface heating unit to the bottom surface of various sized cooking utensils to improve the efficiency of heating of the cooking utensils by the energy source of the surface heating unit. Various arrangements have been proposed to accomplish such matching including the provision of selectively energized sheathed resistance conductor portions in a heating such as is disclosed in Patent No. 3,172,996, issued Mar. 9, 1965. In such arrangements, however, relatively expensive switches are required and, furthermore, a plurality of heat sources are required to accomplish the matching operation.

It is an object of the present invention, therefore, to improve surface heating units by the provision of means therein to effect a variable area heat transfer region on the heating unit without the need for a plurality of heat sources and associated switch means.

A further object of the present invention is to improve surface heating assemblies by the provision therein of a cooking unit including a single source of electrical heat associated with a cooking surface and means for varying the area of heat applied by the source on the cooking surface whereby the surface will be adjustable to heat various sized utensils.

Yet another object of the present invention is to improve surface heating assemblies including a continuous planar utensil supporting surface by the provision therein of a source of heat for directing energy through a predetermined planar extent of the cooking surface and wherein means are interposed between the source of heat and the cooking surface for varying the area of heat applied on the cooking surface.

Still another object of the present invention is to improve domestic electrical ranges by the provision therein of a single unbroken, solid top thereon having opening means associated therewith for defining a plurality of cooking regions on the top with a predetermined planar extent and wherein each of the openings has a single source of electrical energy associated therewith and means for varying the area of the planar extent of the openings heated by the electrical source whereby the cooking regions may be matched with various sized utensils.

Still another object of the present invention is to improve surface heating units by the provision therein of a cooking surface of infrared transmissive material having an opaque mask thereon with an opening defining a surface cooking region on the surface, and wherein an electrically energizable resistance element is located in spaced relationship with the opening defined by the mask and is energizable into the infrared range for directing radiant energy through the opening and by the further provision of an adjustable aperture forming means interposed between the surface and the resistance element and operable to vary the area heated by said resistance element on said surface whereby the surface is adjustable for different sized utensils.

A more specific object of the invention is to improve surface heating units of the type set forth in the preceding object by the provision of a reflector plate for directing energy from the resistance element through the variable aperture forming means and wherein the variable aperture forming means includes an infrared reflective surface for directing energy from the resistance element to the reflector plate for eventual passage through the opening in the aperture forming means for passage through the heated area of the cooking surface.

Further objects and advantages of the present invention will be apparent from the following description, reference being had to the accompanying drawings wherein preferred embodiments of the present invention are clearly shown.

In the drawings:

FIGURE 3 is a view in horizontal section taken along the line 3—3 of FIGURE 2; and FIGURE 4 is a view, partially in elevation and partially in section, of another embodiment of the present invention.

Figure 1:
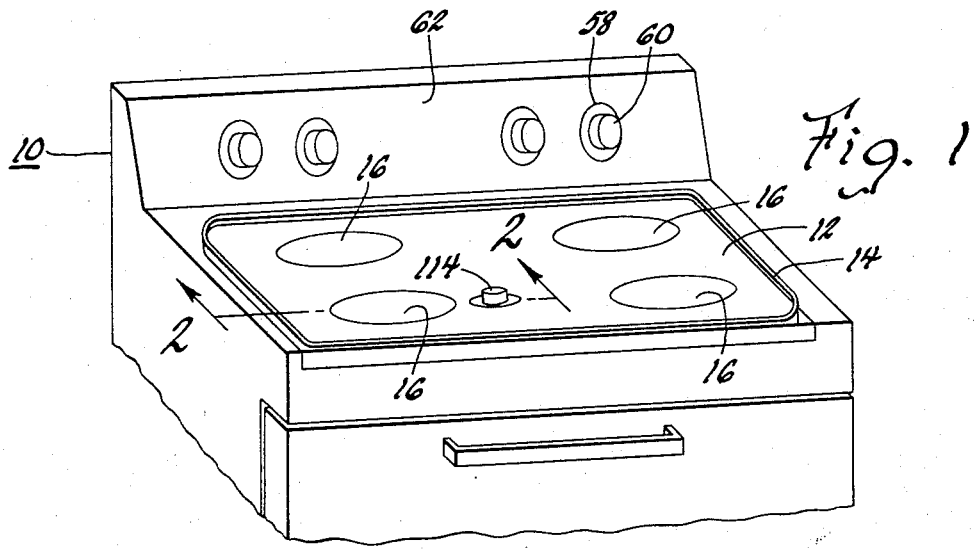
FIGURE 1 is a view in perspective of a domestic electric range including the present invention.
Figure 2:
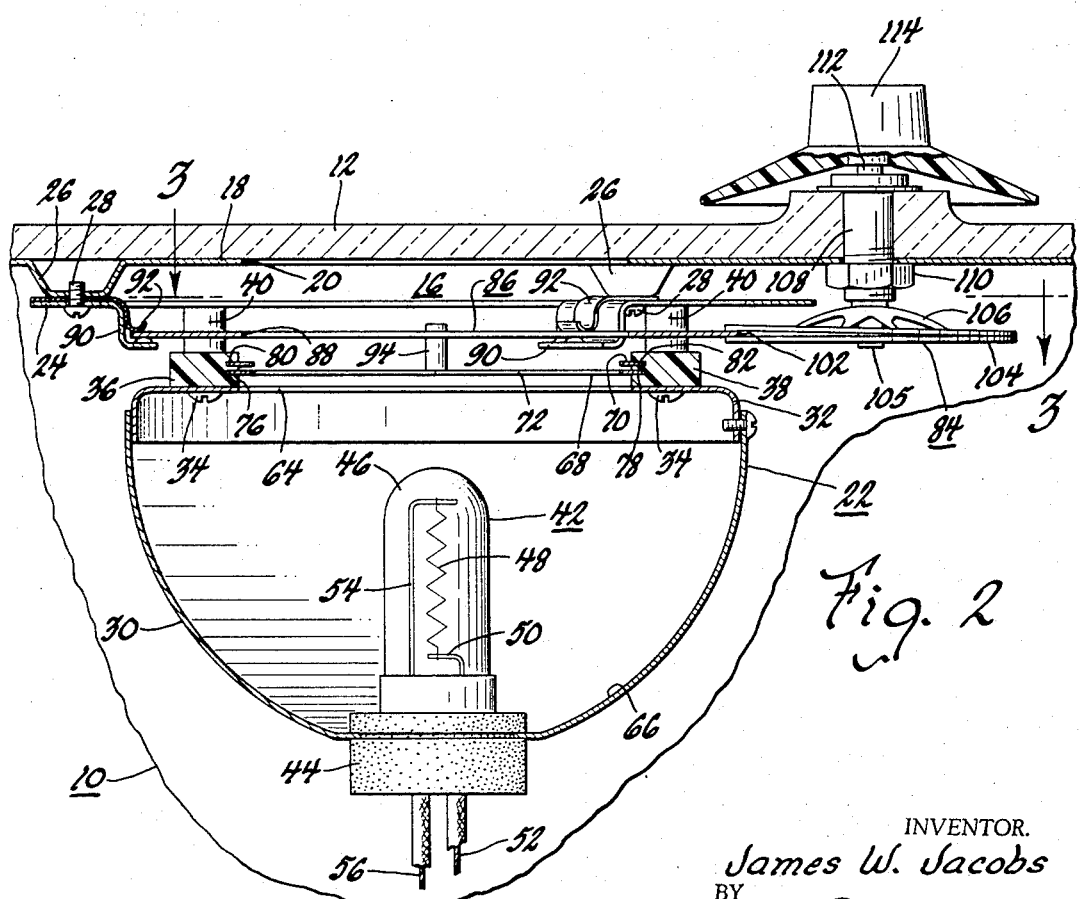
FIGURE 2 is an enlarged view in vertical section taken along the line 2—2 of FIGURE 1.

Referring now to the embodiment of FIGURES 1 through 3, a domestic range 10 is illustrated including a unitary top 12 extending across substantially the full upper surface of the range 10. The unitary top 12 has an upwardly directed peripheral flange 14 thereon for trapping utensil spillage on the upper surface of the range 10 and has a plurality of cooking regions 16 defined thereon by an opaque member or mask 18 that is located under and across the bottom surface of the top 12 with a plurality of openings 20 therein to define the previously mentioned cooking regions 16.

The top 12 is formed of an infrared transmissive material such as quartz, a high silica glass such as Vycor, manufactured by Corning Glass, or a recrystallized glass ceramic such as CerVit, manufactured by Owens-Illinois. The top thereby is characterized as having a relatively low coefficient of thermal expansion and good strength characteristics, especially with respect to thermal shock. Associated with each of the cooking regions 16 on the range 10 is an improved variable area cooking unit 22 for selectively directing energy from a source of heat against varying portions of the planar extent of each of the heating or cooking regions 16.

More particularly, each of the units 22 includes a retainer plate 24 that is fastened to spaced apart dimples 26 in the opaque member 18 by suitable means such as screws 28. Two of the connections of the retainer plate 24 to the opaque member 18 is illustrated in FIGURE 2. Each of the units 22 further includes a parabolic reflector plate 30 having an upper ring portion 32 thereof fastened to the ring 24 by a plurality of fastening elements representatively shown as being elongated screws 34 directed through spaced apart rails 36, 38 on the upper surface of the ring portion 32, thence through tubular spacer elements 40 into threaded engagement with the retainer ring 24.

Within the reflector plate 30 is located a single electrical heating source 42 including an electrical insulating base 44 and a bulb-like enclosure 46 of infrared transmissive material which encloses a tungsten heating element 48 having one end thereof electrically connected to a terminal 50 that is electrically connected to a lead wire 52 through the base 44 and the opposite end thereof electrically connected to a terminal 54 which, in turn, is electrically connected to a lead wire 56 through the base 44.

Each of the heaters 42 is adapted to be electrically connected by the lead wires 52, 56 to a suitable source of power through a selector switch 58, representatively shown as including a manually adjustable knob 60 on a rearwardly located control panel 62 of the range 10.

The heating source 42 in the illustrated unit 22 is concentrically located within the parabolically-shaped reflector 30 whereby infrared energy therefrom is either passed through an opening 64 in the top ring portion 32 of the reflector 30 or reflected off an infrared inner surface 66 of the reflector and then directed through the opening 64. Above the opening 64 is located a pair of spaced apart iris members 68, 70 each having V-shaped ends 72, 74 facing one another. The iris member 68 has the sides thereof slidably received in grooves 76, 78 in the rails 36, 38, respectively. The iris member 70 has the sides thereof slidably received in grooves 80, 82 in the rails 36, 38. The iris members 68, 70 have the bottom surfaces thereof polished or coated by an infrared reflective material.

Each of the iris members 68, 70 is movable with respect to one another in the rails 36, 38 by an actuating mechanism 84 including an annular cam disc 86 having a central opening 88 therein of the same planar extent as the opening 20 in the opaque member 18 that is located in aligned concentric relationship with the opening 20. The disc 86 is carried by a plurality of circumferentially located depending tabs 90 on the retainer ring 24 and is spring biased against the tabs 90 by hold-down springs 92 secured by the screws 28 on the retainer ring 24 in overlying relationship with the tabs 90. An operating pin 94 secured to the iris member 68 is directed into a cam groove 96 in the disc 86 and a like operating pin 98 secured to the iris member 70 is directed through a cam groove 100 in the disc 86. The disc has an outer peripheral segment 102 thereof frictionally received in interlocking engagement between a member 104 on the end of a shaft 105 and a spring washer 106 on the shaft 105. The shaft 105 is directed through a bushing 108 secured to the top 12 by a nut 110. An upper end 112 of the shaft 105 is secured to a manually rotatable adjusting knob 114. Upon rotation of the knob 114, the disc 86 is rotated to move the grooves 96, 100 therein with respect to the operating pins 94, 98 to cause the iris members 68, 70 to move together or apart to produce a variable sized opening 115 therethrough. In FIGURE 3, two of the variable positions of the iris members 68 and 70 are illustrated.

While two iris members are illustrated, it will be appreciated that for a closer control of the variable sized opening 115, a greater number of iris members can be provided in the assembly in the same manner as are iris members 68, 70.

By virtue of the embodiment of the invention illustrated in FIGURES 1 through 3, when the controller 58 is turned on to energize the infrared emissive heat source 42, the energy therefrom can be directed to heat a variable portion of the heating region 16 on the top 12 to match various size cooking utensils supported thereon. For example, with relatively small bottomed utensils, the knob 114 is moved in a direction to cause the iris members 68, 70 to be moved in the position shown in dotted lines in FIGURE 3. The energy from the bulb 42 thereby is concentrated through the limited planar extent of the broken line region shown in FIGURE 3 to produce a close matching of the energy output of the infrared source 42 to the bottom surface of the small utensil. If a larger utensil is placed on the region 16, merely by adjusting the knob 114, the opening 115 formed by the apertures is increased to cause energy from the infrared source 42 to heat a greater portion of the heating region 16 in the top 12.

In the embodiment of the invention shown in FIGURE 4, an infrared transmissive top 116 is illustrated including an opaque member 118 on the undersurface thereof. In FIGURE 4 a heating unit 120 is illustrated in elevation and partially broken away. The heating unit 120 is carried on the top 116 in alignment with a slightly raised surface 122 of the top 116 that defines a utensil supporting surface having a planar extent like the heating region 16 in the first embodiment. The heating unit 120 is supported in depending relationship with the top 116 by means identical to those shown in the first embodiment. Furthermore, the heating unit 120 is associated with a variable aperture forming iris mechanism 124 of the same form as shown in the first embodiment. In this embodiment the single electrical heating source is represented by a spirally coiled resistance element 126 that underlies the planar extent of the utensil supporting surface 122. The spiral coil 126 has opposite ends thereof electrically connected to terminals 128 and 130 directed through a relatively shallow cup-shaped reflector member 132 having a radially outwardly directed edge 134 thereof supported by a ring member 136 that fastens to a retainer ring like that in the first embodiment. The resistance element 126 is supported by a plurality of radially outwardly directed arms 138 at grooves 140 therein to locate the resistance element out of direct thermal contact with the reflector plate 132. Details of the resistance element and the support arms are more specifically set forth in copending United States application, Ser. No. 466,659, filed June 24, 1965 now United States Patent No. 3,348,025 issued Oct. 17, 1967.

In the embodiment of FIGURE 4 the energy from the resistance element 126 is directed through a variable size opening in the iris members as was the case in the first embodiment to heat a variable part of the planar extent of the utensil supporting surface 122.

In view of the above description, it will be appreciated by those skilled in the art that the present invention represents an improved and unusually economical arrangement for variable areas of a heating utensil supporting surface to improve the transfer of energy from a heating source to a heated utensil. Furthermore, by virtue of the present invention, these results are accomplished merely by the use of a single source of electrical heat and without the need for expensive switching arrangements for energizing a plurality of electrical heat sources or the like.

While the embodiments of the present invention as herein disclosed constitute preferred forms, it is to be understood that other forms might be adopted.

What is claimed is as follows:

1. In a domestic cooking surface assembly, the combination of, a translucent solid continuous top of infrared transmissive material, an opaque member on one surface of said top having a plurality of openings therein defining cooking surface regions on said top, a single source of electric heat being disposed in alignment with one of said openings, said single source of electric heat including a high temperature resistance element energizable into the infrared range, said resistance element being formed of tungsten, an evacuated infrared transparent enclosure surrounding said resistance element, a parabolic reflector for focusing energy from said resistance element through said one of said openings formed by said opaque member, means disposed between said single source of heat and said top for varying the area of heat applied by said single source on the surface unit heating region defined by said one of said openings, said means for varying the area of applied heat including spaced apart movable members, and means for adjusting said members with respect to one another to preclude direct transfer of a predetermined part of energy from said single source of electric heat through said one of said openings formed in said opaque member.

2. In a domestic cooking surface assembly, the combination of, a translucent solid continuous top of infrared transmissive material, an opaque member on one surface of said top having a plurality of openings therein defining cooking surface regions on said top, a single source of electric heat being disposed in alignment with one of said openings, said single source of electric heat including a high temperature resistance element energizable into the infrared range, a reflector plate underlying said resistance element for directing energy across the planar extent of said one of said openings in said opaque member, means for supporting said resistance element out of direct conductive heat transfer relationship with said reflector plate, means disposed between said single source of heat and said top for varying the area of heat applied by said single source on the surface unit heating region defined by said one of said openings, said means for varying the area of applied heat including spaced apart movable members, and means for adjusting said members with respect to one another to match the area of applied heat to the bottom surface area of a utensil supported on the top and to preclude dispersion of infrared energy away from the surface cooking region on which the utensil is supported.

References Cited

UNITED STATES PATENTS

| 1,102,392 | 7/1914 | Denhard | 219—456 |
| 1,673,296 | 6/1928 | McManus | 219—456 |
| 2,727,133 | 12/1955 | Scofield | 219—464 |
| 2,861,166 | 11/1958 | Cargill | 219—68 |
| 3,001,055 | 9/1961 | Lozier et al. | 219—349 |
| 3,348,025 | 10/1967 | Bassett et al. | 219—467 |

RICHARD M. WOOD, *Primary Examiner.*

L. H. BENDER, *Assistant Examiner.*